United States Patent [19]
Nishioka

[11] Patent Number: 6,033,244
[45] Date of Patent: Mar. 7, 2000

[54] CONNECTOR DEVICE FOR IC CARD

[75] Inventor: Toru Nishioka, Miyagi-ken, Japan

[73] Assignee: Alps Electric Co., Ltd., Japan

[21] Appl. No.: 09/234,023

[22] Filed: Jan. 19, 1999

[30] Foreign Application Priority Data

Jan. 26, 1998 [JP] Japan .................................. 10-012522

[51] Int. Cl.⁷ ................................................. H01R 13/62
[52] U.S. Cl. ............................................................ 439/159
[58] Field of Search .................................... 439/159, 152, 439/155, 541.5

[56] References Cited

U.S. PATENT DOCUMENTS

| | | | |
|---|---|---|---|
| 5,499,925 | 3/1996 | Lwee | 439/159 |
| 5,536,180 | 7/1996 | Ishida et al. | 439/159 |
| 5,575,669 | 11/1996 | Lin et al. | 439/159 |
| 5,599,197 | 2/1997 | Ishida et al. | 439/159 |
| 5,655,918 | 8/1997 | Soh | 439/159 |
| 5,683,258 | 11/1997 | Takano et al. | 439/159 |
| 5,846,096 | 12/1998 | Ishida | 439/159 |
| 5,871,365 | 2/1999 | Kajiura | 439/159 |
| 5,906,510 | 5/1999 | Lwee | 439/159 |

*Primary Examiner*—Neil Abrams
*Assistant Examiner*—Brian S. Webb
*Attorney, Agent, or Firm*—Brinks Hofer Gilson & Lione

[57] ABSTRACT

In the connector device for IC card according to the present invention, when an IC card as inserted into the connector device is to be ejected, a push rod is projected up to a projecting position and is pushed in this state, whereby the IC card is ejected through a single transfer pin. In the event the push rod should be projected by mistake despite the ejection of the IC card being not required, a knob is turned at the projecting position, causing the transfer pin to shift from a first heart cam groove to a second heart cam groove, and in this state the push rod is pushed toward a push-in position. Since by turning a single transfer pin the IC card ejecting motion is cancelled and the IC card is maintained in its inserted state, the usual ejecting motion requiring frequent operations becomes simple and easy in comparison with the prior art. Besides, since the cancellation of ejection, which is less frequent, is effected by the rotating motion, it is possible to provide a connector device superior in operability.

9 Claims, 14 Drawing Sheets

CONNECTOR DEVICE FOR IC CARD

BACKGROUND OF THE INVENTION

1. Field of the Invention

The present invention relates to a connector device for IC card to be mounted in an apparatus which is used by inserting and pulling the IC card into and out of the apparatus.

2. Description of the Related Art

Generally, a connector device for IC card substantially comprises a pin header having a large number of pin contacts to be connected to socket contacts disposed in the IC card, the pin contacts being disposed in a pin housing, a frame for guarding the IC card when inserted or ejected, and an ejection mechanism for ejecting from the pin contacts the IC card as inserted. There also is known a connector device for IC card wherein the housing and the frame are formed in one piece with each other.

Widely adopted heretofore is a connector device for IC card wherein the ejection mechanism is made up of a push rod held on an outside face of a frame so as to be reciprocatable in the direction in which the IC card is inserted and ejected, and an ejection lever supported pivotably by the frame or a pin housing, one end portion of the ejection lever being engaged with the push rod.

In a connector device for IC card having such an ejection mechanism, when the push rod is pushed with the IC card inserted, a pawl portion of the ejection lever which rotates interlockedly with the push rod pushes the IC card to the user's side, thus permitting the IC card to be pulled out easily with fingers of the user. However, if the push rod as projected should be operated erroneously, the IC card being connected to the connector device is ejected against the user's will.

On the other hand, a connector device for IC card disclosed in Japanese Published Unexamined Utility Model Publication No.Hei 6-13072 is provided with first and second transfer levers which are linked between a push rod and a slide plate, a third transfer lever pivotally secured to the first transfer lever and capable of being engaged with and disengaged from the second transfer lever, and a heart cam mechanism capable of holding the push rod at both push-in position and first projecting position. Pushing force of the push rod is transmitted selectively to the slide plate in proportion to the amount of projection of the push rod.

More particularly, with an IC card inserted, the push rod is held at the push-in position and the third transfer lever is not in engagement with the second transfer lever, but if the push rod is projected up to the first projecting position by the heart cam mechanism and is thereafter pulled up to a second projecting position closer to the user side, the third transfer lever comes into engagement with the second transfer lever at the second projecting position. In this state, therefore, if the push rod is pushed toward the push-in position, the pushing force is transmitted to the slide plate through each transfer lever, so that the slide plate pushes the IC card toward the user side.

Thus, during connection of the IC card, the push rod is held at the push-in position, and only when the IC card is to be discharged, the push rod is projected up to the second projecting position, whereby the IC card can be prevented from being ejected against the user's will.

According to the connector device for IC card disclosed in the foregoing unexamined publication, as described above, the push rod is held at the push-in position during connection of the IC card, and only at the time of ejection of the IC card the push rod is projected. Therefore, it is possible to prevent the IC card from being discharged against the user's will. Besides, even if the push rod should be projected by mistake though there is no need to discharge the IC card, what should be done is pushing the push rod from the first projecting position without pulling it up to the second projecting position, whereby the push rod is again held at the push-in position without ejection of the IC card and thus the improvement of operability can be attained.

However, since three transfer levers, which are linked together, are disposed between the push rod and the slide plate and the pushing force of the push rod is transmitted to the slide plate or is cut off according to postures of those transfer levers, it is necessary to ensure a wide space for rotation of the transfer levers, that is, the reduction in size of the connector device for IC card is obstructed.

For the above reason, the transfer levers are inevitably required to be disposed on the top or bottom side of an IC card inlet port. Particularly, in the case of a connector device for IC card permitting insertion and ejection of two or more IC cards, it is necessary to ensure a sufficient space and stack plural sets of transfer levers therein vertically, thus giving rise to the problem that the connector device for IC card becomes large-sized also in the vertical direction.

Further, operations are required three times during the usual IC card ejecting motion, which are an operation for causing the push rod held at the push-in position to be projected up to the first projecting position, an operation for pulling out the push rod from the first projecting position up to the second projecting position, and an operation for pushing the push rod from the second projecting position to the push-in position. Thus, there arises the problem that the usual IC card ejecting motion requiring frequent operations becomes more complicated.

SUMMARY OF THE INVENTION

For solving the above-mentioned problems, according to the present invention, in the first aspect thereof, there is provided a connector device for IC card, including: a frame for supporting the IC card so as to permit insertion and ejection of the IC card with respect to the connector device; a push rod capable of reciprocating between a push-in position and a projecting position; a transfer pin secured to the push rod pivotably; and a knob attached pivotably to said push rod, wherein with the IC card inserted into the connector device, the push rod is held at the push-in position by a lock mechanism of the transfer pin, and in this state, by a first pushing motion of the push rod, the lock mechanism of the transfer pin is unlocked and the push rod moves to the projecting position, then at the projecting position the IC card is ejected by the transfer pin in accordance with a second pushing motion of the push rod, further, when the push rod is at the projecting position, the knob is turned to rotate the transfer pin and thereafter the transfer pin is rotated by a pushing motion of the push rod to cancel the ejection of the IC card.

In the second aspect of the present invention there is provided, in combination with the connector device in the first aspect, a connector device for IC card wherein the lock mechanism is made up of two, juxtaposed, first and second heart cam grooves, the transfer pin is rotated and allowed to trace the first and second heart cam grooves, further, a drive plate engageable with and disengageable from the transfer pin and capable of reciprocation is provided, and when the push rod lying at the projecting position is pushed, the transfer pin, in an opposed state to the drive plate, traces the first heart cam groove and moves the drive plate, causing the IC card to be ejected through the drive plate, further, with the push rod lying at the projecting position, the knob is turned, causing the transfer pin to shift from the first heart cam groove to the second heart cam groove, thereafter, when the push rod is pushed, the transfer pin traces the second heart cam groove and the opposed state of the transfer pin to the drive plate is cancelled to cancel the ejection of the IC card.

In the third aspect of the present invention there is provided, in combination with the connector device in the second aspect, a connector device for IC card wherein adjacent cam grooves of the juxtaposed, first and second heart cam grooves are used partially in common.

In the fourth aspect of the present invention there is provided, in combination with the connector device in the second aspect, a connector device for IC card wherein when the push rod is at the push-in position, the transfer pin is locked by the first heart cam groove, the transfer pin and the drive plate are not opposed to each other, and when the push rod is pushed at the push-in position, the transfer pin moves together with the push rod and traces the first heart cam groove, with the transfer pin becoming opposed to the drive plate, allowing the push rod to assume the projecting position, further, at the projecting position the knob is turned, causing the transfer pin to shift from the first heart cam groove to the second heart cam groove, thereafter, when the push rod is pushed, the transfer pin traces the second heart cam groove and is locked by the second heart cam groove, allowing the push rod to assume the push-in position, further, when the push rod is pushed at the push-in position, the transfer pin moves together with the push rod and traces the second heart groove, with the transfer pin becoming opposed to the drive plate, allowing the push rod to assume the projecting position.

In the fifth aspect of the present invention there is provided, in combination with the connector device in the first aspect, a connector device for IC card further including a spring member which, after the rotation of the knob, restores the knob to its state before the rotation.

In the sixth aspect of the present invention there is provided, in combination with the connector device in the fifth aspect, a connector device for IC card wherein the spring member is integral with the knob, and part of the spring member is brought into abutment against the push rod.

In the seventh aspect of the present invention there is provided, in combination with the connector device in the second aspect, a connector device for IC card wherein the transfer pin is formed in U shape having an upper side portion and bent portions formed at both ends of the upper side portion, the push rod has a protuberance, the upper side portion of the transfer pin is brought into abutment against the said protuberance, one bent portion of the transfer pin is brought into engagement with the heart cam grooves, and between the one bent portion of the transfer pin and the said protuberance, the upper side portion of the transfer pin is pressed resiliently by a resilient member.

In the eighth aspect of the present invention there is provided, in combination with the connector device in the seventh aspect, a connector device for IC card wherein the bent portions formed at both ends of the upper side portion of the U-shaped transfer pin have the same length.

In the ninth aspect of the present invention there is provided, in combination with the connector device in the seventh aspect, a connector device for IC card wherein when the knob is turned, the transfer pin is shifted from the first heart cam groove to the second heart cam groove through the resilient member.

BRIEF DESCRIPTION OF THE DRAWINGS

FIGS. 5A to 5C are diagrams showing a frame used in the connector device for IC card, in which FIG. 5A, FIG. 5B and FIG. 5C are a plan view, a front view and a right side view, respectively, of the frame;

FIGS. 6A and 6B are diagrams showing a push rod used in the connector device for IC card, in which FIG. 6A and FIG. 6B are a plan view and a front view, respectively, of the push rod;

FIGS. 7A and 7B are diagrams showing a drive plate used in the connector device for IC card, in which FIG. 7A and FIG. 7B are a plan view and a front view, respectively, of the drive plate;

FIGS. 8A and 8B are diagrams showing a resilient member used in the connector device for IC card, in which FIG. 8A and FIG. 8B are a plan view and a front view, respectively, of the resilient member;

FIGS. 9A to 9F are diagrams showing a knob used in the connector device for IC card, in which FIG. 9A, FIG. 9B, FIG. 9C and FIG. 9D are a plan view, a front view, a bottom view and a left side view, respectively, FIG. 9E is a sectional view taken on line A—A in the plan view A, and FIG. 9F is a sectional view taken on line B—B in the front view B;

FIGS. 11 are explanatory diagrams showing what state the push rod, the frame and the knob normally assume in the connector device for IC card, in which

FIGS. 12A and 12B are explanatory diagrams showing what state the push rod, the frame and the knob assume during operation in the connector device for IC card, in which FIG. 12A is a is an expanded sectional plan view of principal portions, and FIG. 12B is an expanded sectional front view of principal portions;

FIGS. 13A and 13B are diagrams explanatory of the connector device for IC card, with the push rod lying at a push-in position, in which FIG. 13A is a plan view and FIG. 13B is a front view;

FIGS. 14A and 14B are diagrams explanatory of the connector device for IC card, with the push rod lying at the projecting position, in which FIG. 14A is a plan view and FIG. 14B is a front view;

FIGS. 15A and 15B are explanatory diagrams showing an operated state of the knob with the push rod lying at the projecting position in the connector device for IC card, in which FIG. 15A is a plan view and FIG. 15B is a front view;

FIGS. 16A and 16B are explanatory diagrams showing heart cam grooves used as a lock mechanism in the connector device for IC card in which FIG. 16A is a plan view and FIG. 16B is a front view;

DETAILED DESCRIPTION OF A PREFERRED EMBODIMENT

Figure 1:
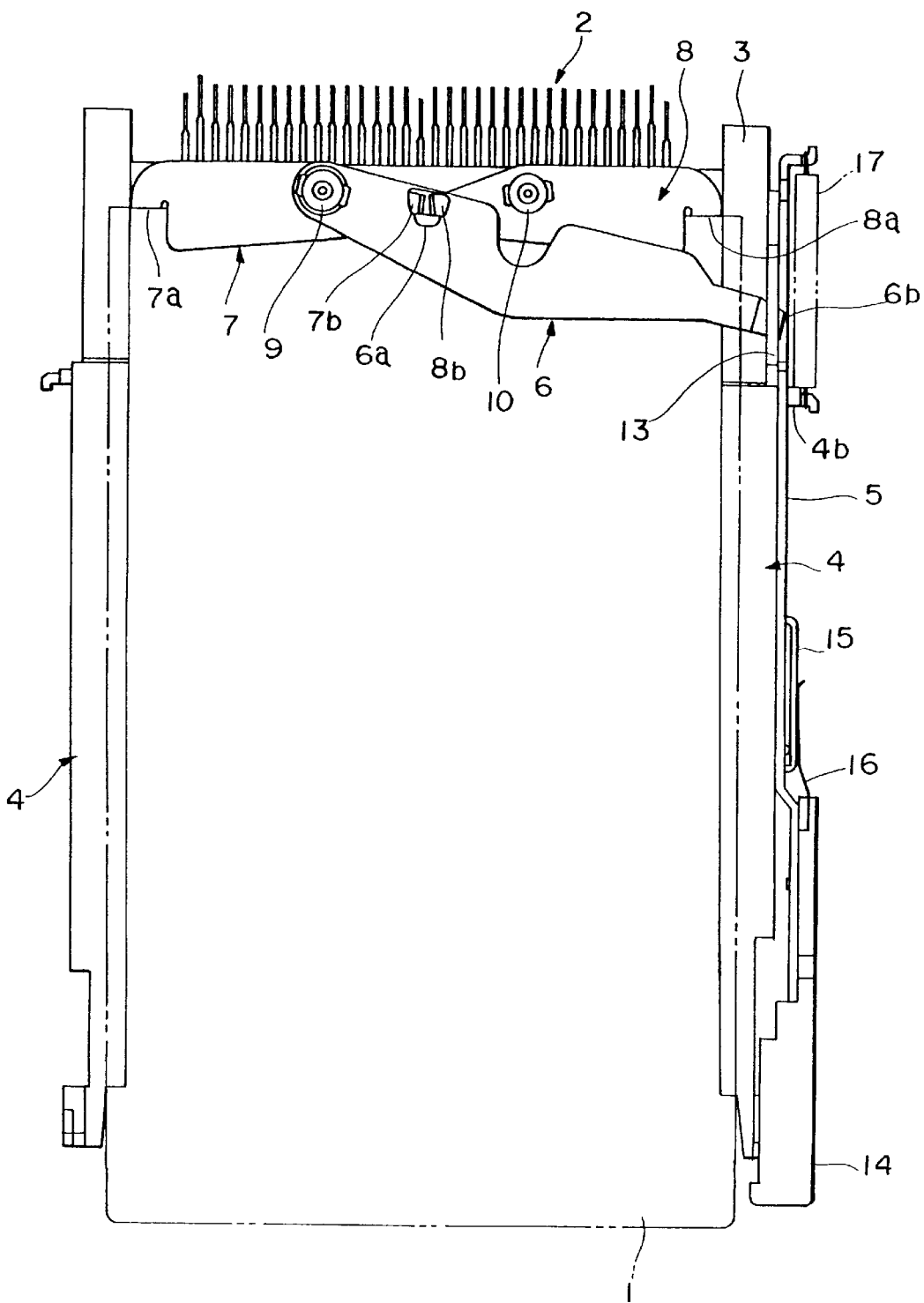
FIG. 1 is a plan view of a connector device for IC card according to an embodiment of the present invention with an IC card inserted therein.

A connector device for IC card according to an embodiment of the present invention will be described in detail hereinunder with reference to FIGS. 1 to 22. As shown in FIGS. 1 to 20, the connector device for IC card embodying the present invention mainly comprises a pin housing 3 having a large number of pin contacts 2 for connection with socket contacts (not shown) disposed in an IC card 1, the pin contacts 2 being press-fitted and fixed into the pin housing at a predetermined arrangement, a pair of frames 4 fixed to the pin housing 3 and functioning to guide the IC card 1 from both transverse sides when the IC card 1 is inserted into the connector device or when it is ejected therefrom, a push rod 5 attached movably to one of the frames 4, an ejection arm 6 pivotally secured to the pin housing 3, and first and second pivotable arms 7, 8 which are also pivotally secured to the pin housing 3. Between the push rod 5 and the ejection arm 6 is disposed an ejection mechanism which will be described later.

Figure 2:
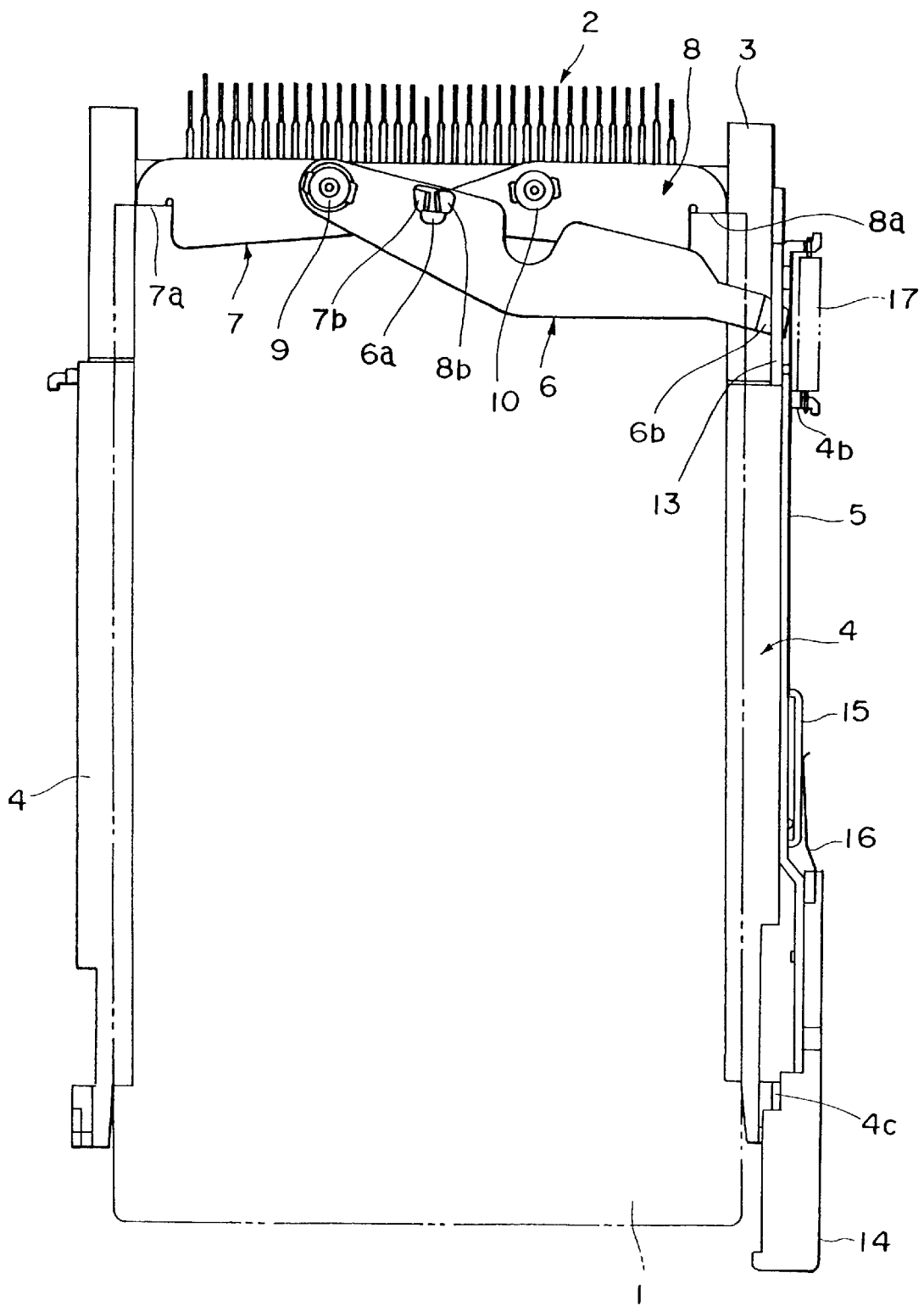
FIG. 2 is a plan view of the connector device with the IC card inserted therein and with a push rod lying in a projecting position.
Figure 3:
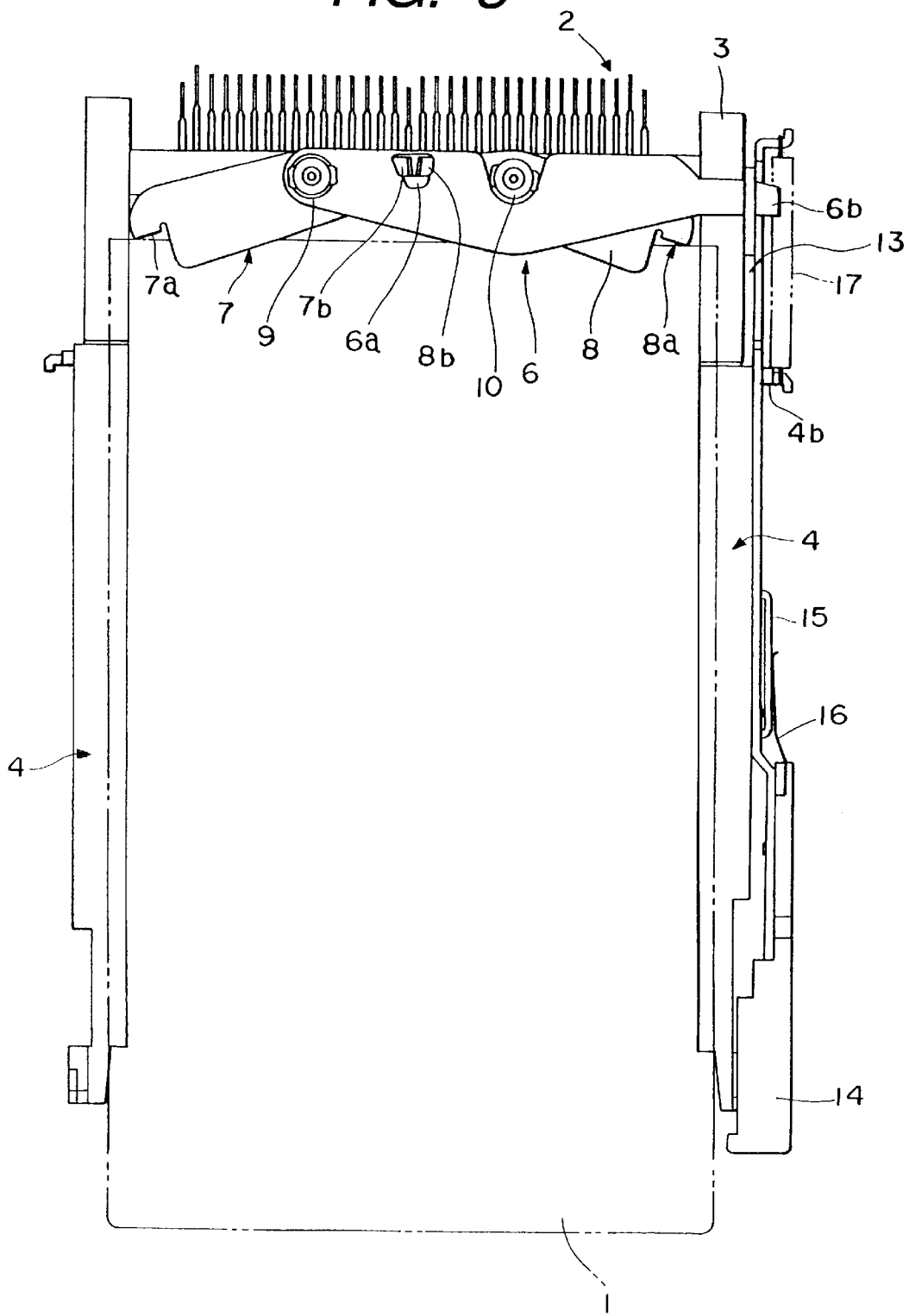
FIG. 3 is a plan view of the connector device for IC card, showing a state just after ejection of the IC card.
Figure 4:
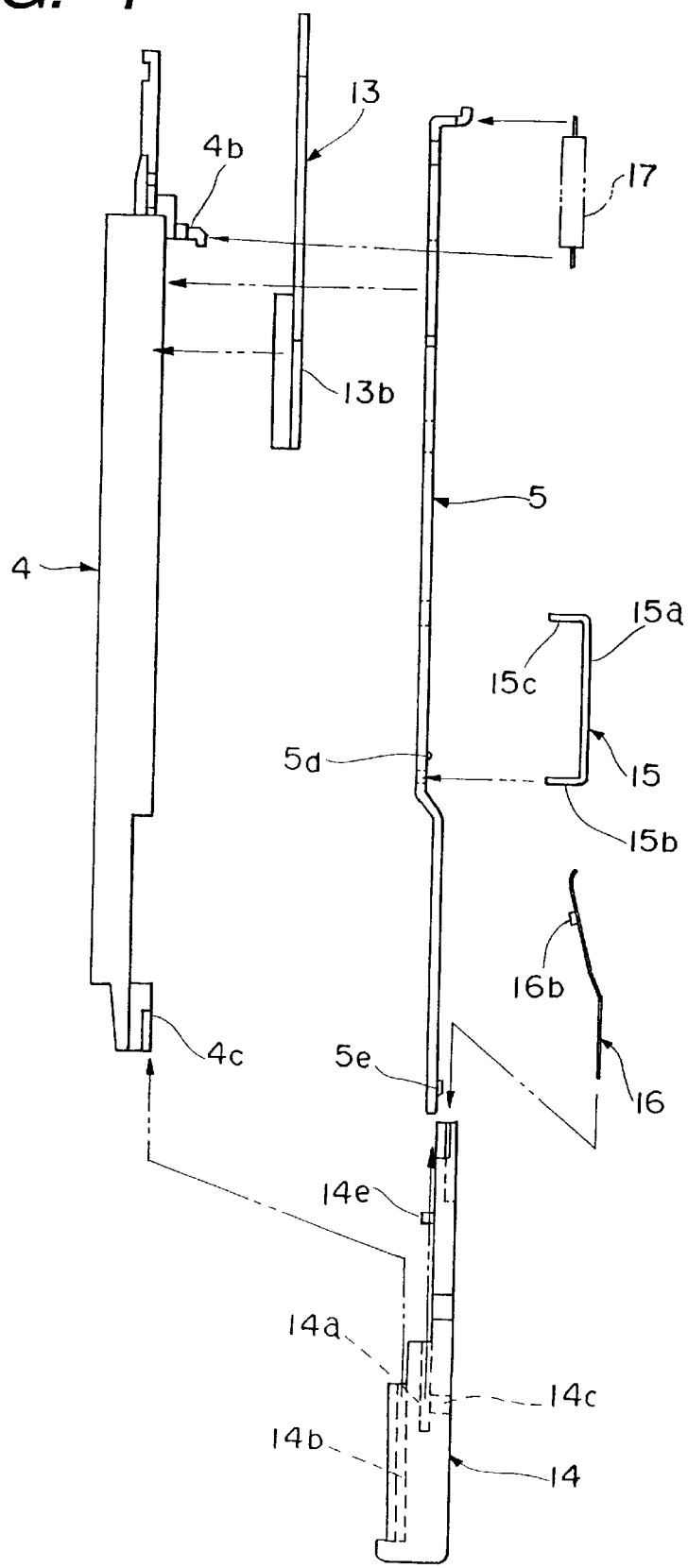
FIG. 4 is an exploded view showing principal portions of an ejection mechanism used in the connector device for IC card.
Figure 5A:
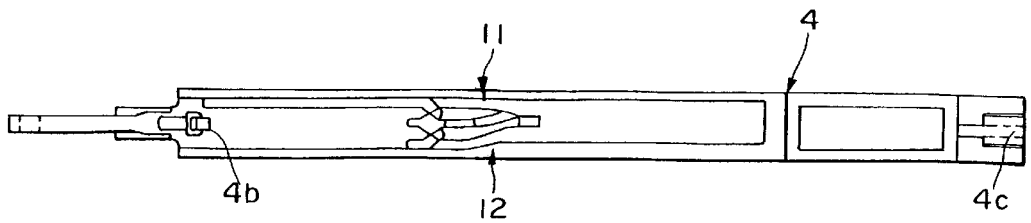
Figure 5B:
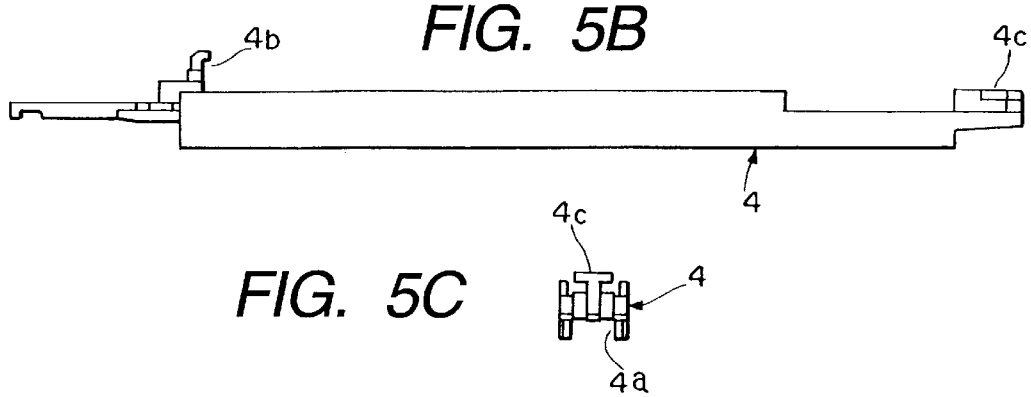
Figure 5C:
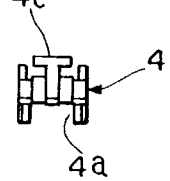

As shown in FIGS. 1 to 3, the pin housing 3 is provided with a first pivot shaft 9 and a second pivot shaft 10, which are spaced from each other at a predetermined interval. One end of the ejection arm 6 is pivotably mounted on the first pivot shaft 9.

The ejection arm 6 is formed with a connecting hole 6a and an engaging portion 6b, the engaging portion 6b projecting outward from the pin housing 3.

The first pivotable arm 7 is also pivotably mounted on the first pivot shaft 9 and is formed with a pawl piece 7a for pushing out the IC card and a tongue piece 7b projecting into the connecting hole 6a of the ejection arm 6.

The second pivotable arm 8 is pivotably mounted on the second pivot shaft 10 and is formed with a pawl piece 8a for pushing out the IC card 1 and a tongue piece 8b projecting into the connecting hole 6a of the ejection arm 6.

The construction of the ejection mechanism will now be described. The connector device for IC card embodying the invention permits insertion and ejection of the IC card 1 along guide grooves 4a formed in inner side faces of the paired frames 4, with the push rod 5 for ejection of the IC card 1 being secured to an outer side face of one frame 4.

Though not shown, plural such structures are stacked vertically to constitute the connector device for IC card.

Particularly, as shown in FIGS. 4, 5A to 5C and 16 to 20, a pair of guide projections 4b and 4c are formed on the outer side face of each frame 4. Between the guide projections 4b and 4c are formed first and second heart cam grooves 11, 12 which constitute a lock mechanism.

The first and second heart cam grooves 11, 12 are formed side by side while using part of adjacent cam grooves in common. More specifically, the heart cam grooves 11 and 12 have cam faces of different heights and use cam faces A1, H, E1 and D1 partially in common. Between cam faces D1 and D2 is formed an inclined cam face J which gradually becomes higher toward the cam face D2, thereby connecting the first and second heart cam grooves 11, 12 with each other.

Figure 7A:
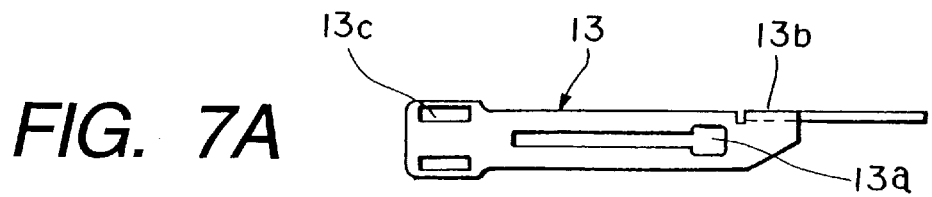
Figure 7B:
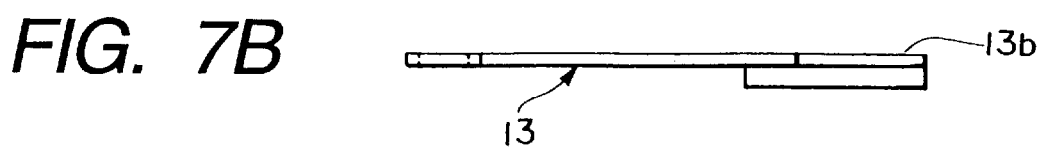

A drive plate 13 is secured to the outer side face of one frame 4 so that it can reciprocate. As shown in FIG. 7, the drive plate 13 has a guide hole 13a to be fitted on the guide projection of the frame.

The drive plate 13 has a receiving portion 13b and engaging holes 13c, the receiving portion 13b having a bent part. The bent part of the receiving portion 13b is fitted in the first heart cam groove 11 and reciprocates just above the cam faces C1 and D1. The engaging portion 6b of the ejection arm 6 is engaged with the engaging hole 13c.

The push rod 5 is mounted to the outer side face of the frame 4 from above the drive plate 13. The push rod 5 is held by the guide projection 4b of the frame 4 so that it can reciprocate in the directions of insertion and ejection of the IC card 1.

Such a knob 14 as shown in FIGS. 9A to 9F, 11A, 11B, 12A and 12B is attached to one end of the push rod 5. The knob 14, which is a molded product formed from a synthetic resin, has holes 14a and 14b formed in two vertical stages, a fitting hole 14c formed through the upper wall and reaches the upper-stage hole 14a, a protuberance 14d formed on the underside, and a spring member 14e formed integrally sideways.

The hole 14a as an engaging hole of the knob 14 is wider on its inlet side, into which the front end portion of the push rod 5 is inserted. As shown in FIGS. 11A, 11B, 12A and 12B, a lug 5e is formed near the front end of the push rod 5 and it is fitted in the fitting hole 14c to connect the push rod and the knob with each other. The knob 14 can move pivotally about the lug 5e.

With the knob 14 secured to the push rod 5, as shown in FIGS. 13A, 13B to 15A, 15B, part of the spring member 14e of the knob 14 is in abutment against a side portion of the push rod 5, causing the knob 14 to revert to its normal state. After the pivotal motion of the knob 14, the knob is restored to its normal state before the pivotal motion.

The guide projection 4c of the frame 4 is loosely fitted in the hole 14b of the knob 14, as shown in FIGS. 11A, 11B, 12A and 12B, and with the guide projection 4c the knob 14 guides the movement of the IC card 1 in the directions of insertion and ejection of the card.

Figure 6A:
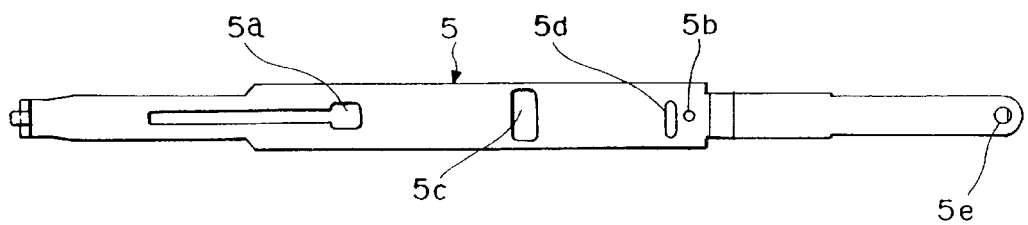
Figure 6B:
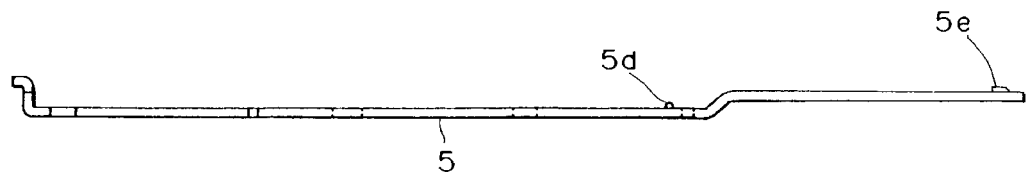

As shown in FIGS. 6A and 6B, a guide hole 5a is formed in the push rod 5 and it is fitted on the guide projection 4b of the frame 4.

Further, a pivot hole 5b and a relief hole 5c are formed in the push rod 5, with a protuberance 5d being formed between the pivot hole 5b and the relief hole 5c.

One transfer pin 15, which is bent in U shape, is secured to the outer side face of the push rod 5.

The transfer pin 15 comprises an upper side portion 15a and bent portions 15b, 15c formed by bending at both ends of the upper side portion 15a, the bent portions 15b and 15c having the same length. One bent portion 15b is inserted into the pivot hole 5b, while the other bent portion 15c passes through the relief hole 5c and is engageable selectively with the cam faces of the first and second heart cam grooves 11, 12. When the transfer pin 15 moves together with the push rod 5, its bent portion 15c can be engaged with or disengaged from the drive plate 13.

The transfer pin 15 is pivotable with the pivot hole 5b as fulcrum. Further, its upper side portion 15a comes into abutment onto the protuberance 5d of the push rod 5, whereby the bent portion 15c of the transfer pin 15 can move vertically corresponding to the height of each cam face and with the protuberance 5d as fulcrum. Since the transfer pin 15 moves pivotally on the protuberance 5d, the frictional resistance between the push rod 5 and the transfer pin 15 is small, thus permitting a smooth movement of the transfer pin.

Figure 8A:
Figure 8B:

A resilient member 16 constituted by such a plate spring as shown in FIGS. 8A and 8B is attached to the knob 14. The resilient member 16 has a hole 16a and a bent piece 16b formed sideways.

With the resilient member 16 held by a groove of the knob 14, the protuberance 14d of the knob 14 is fitted in the hole 16a of the resilient member so that the resilient member rotates together with the knob 14. As shown in FIGS. 13A, 13B to 15A, 15B, the bent piece 16b of the resilient member 16 is capable of engagement with and disengagement from the transfer pin 15. When the knob 14 rotates, the bent piece 16b hooks the transfer pin 15 and causes the bent portion 15c side to shift from the first heart cam groove 11 to the second heart cam groove 12 with the bent portion 15b of the transfer pin 15 as a rotating shaft.

Figure 10:
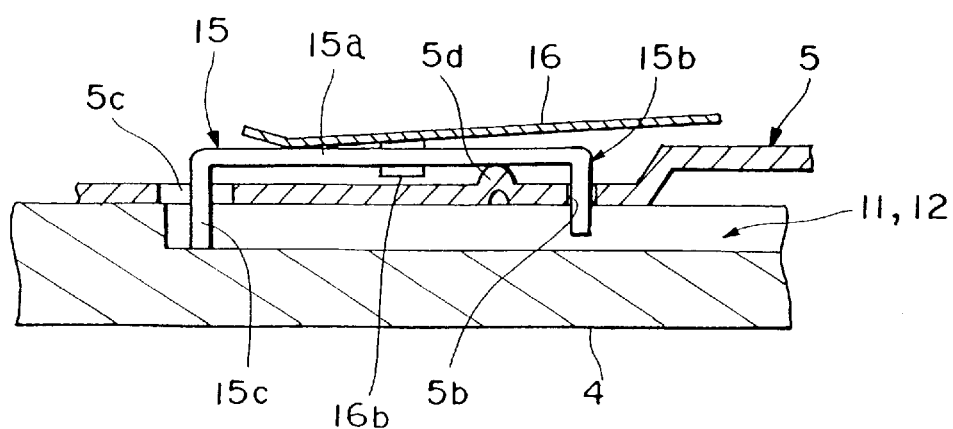
FIG. 10 is a sectional view showing principal portions of the ejection mechanism used in the connector device for IC card.
Figure 9A:
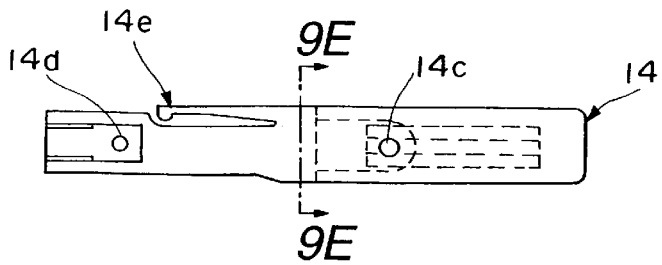
Figure 9B:
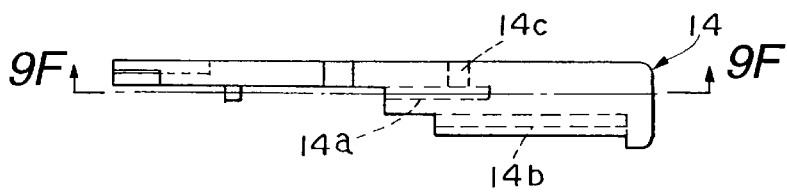
Figure 9C:
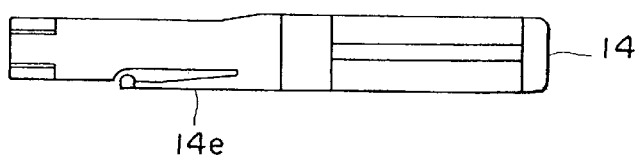
Figure 9D:
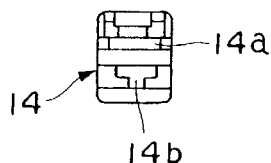
Figure 9E:
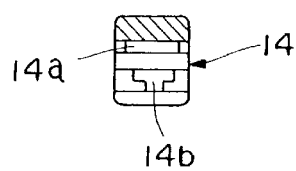
Figure 9F:
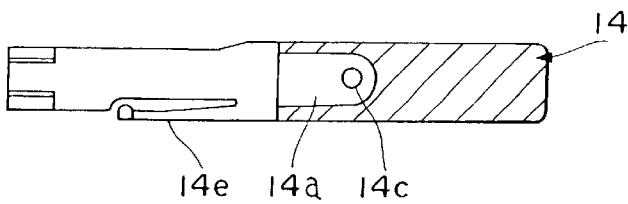
Figure 11A:
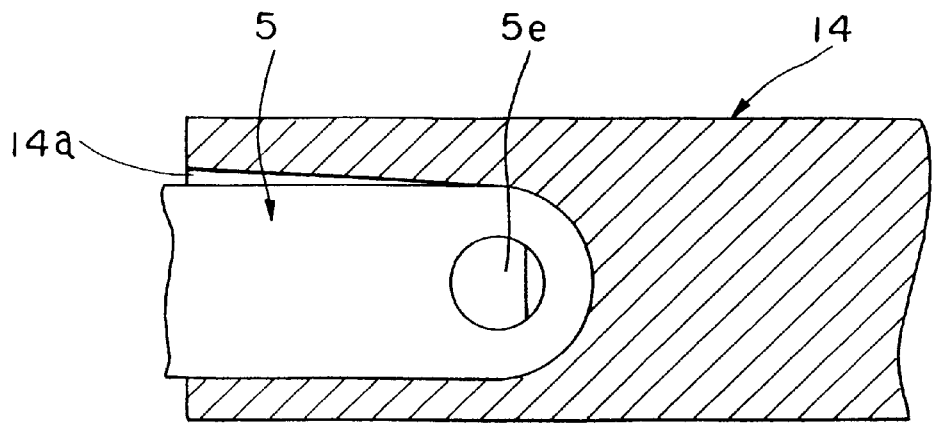
FIG. 11A is an expanded sectional plan view of principal portions.
Figure 11B:
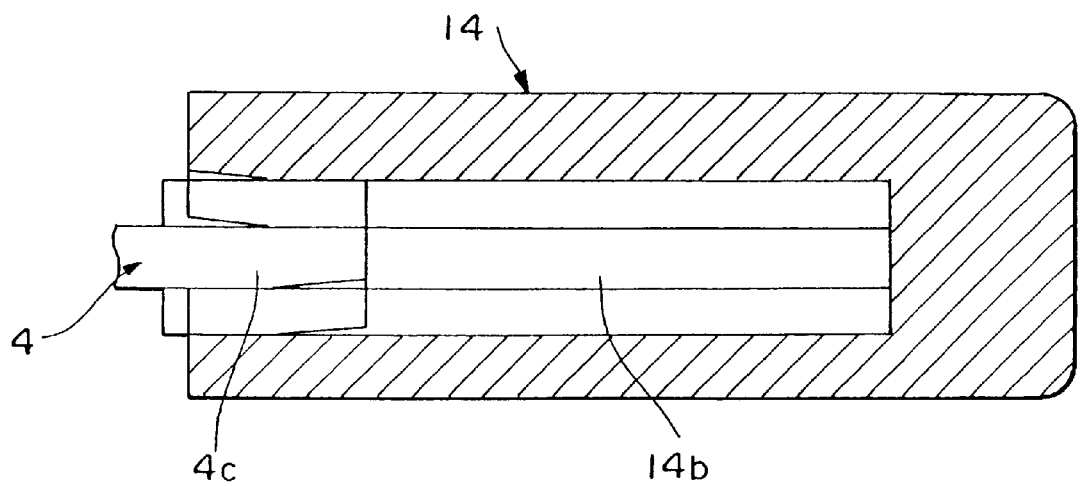
FIG. 11B is an expanded sectional front view of principal portions.
Figure 12A:
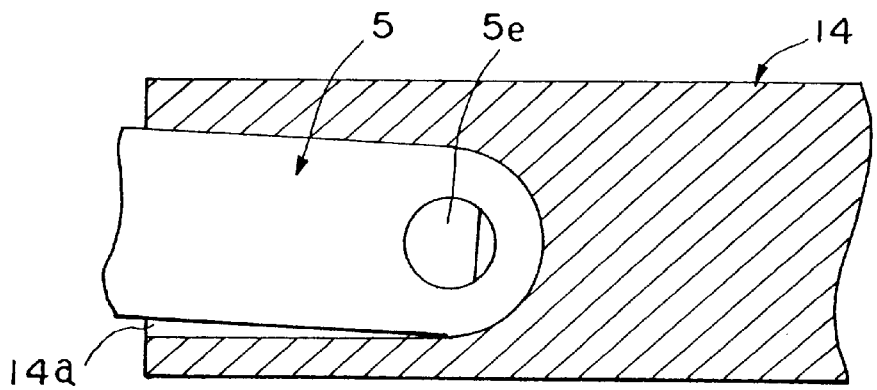
Figure 12B:
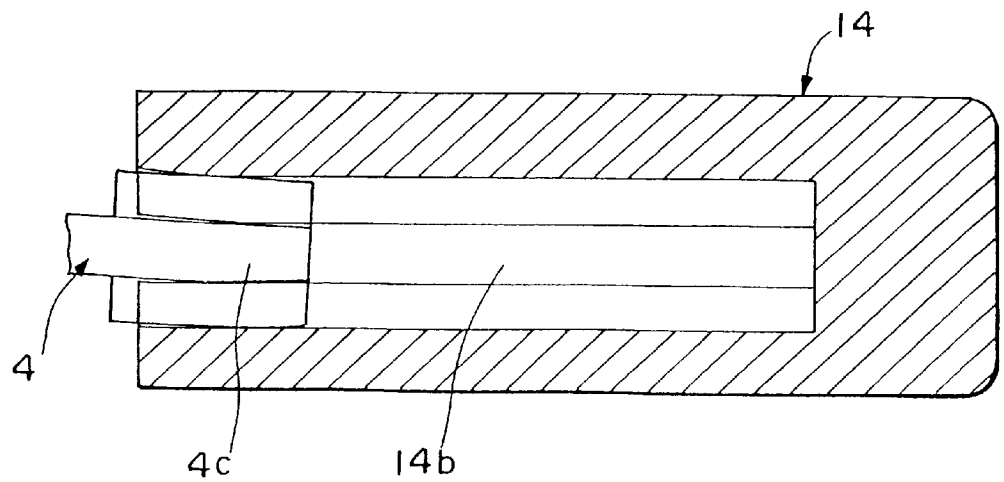

As shown in FIG. 10, between the bent portion 15c of the transfer pin 15 and the protuberance 5d of the push rod 5, the resilient member 16 presses the upper side portion 15a of the transfer pin 15 elastically, causing the bent portion 15c to come into elastic contact with a cam face, and further the transfer pin 15 is tilted to thereby separate one bent portion 15b from the cam face.

Though not shown, the resilient member 16 may be attached to the push rod 5, and as to the rotation of the transfer pin 15 with use of the knob 14, a direct rotation thereof may be made with the knob 14.

A coiled spring 17 is stretched between the guide projection 4b of the frame 4 and the push rod 5, whereby the push rod 5 is urged in a projecting direction from the front face of the frame 4.

Figure 17:
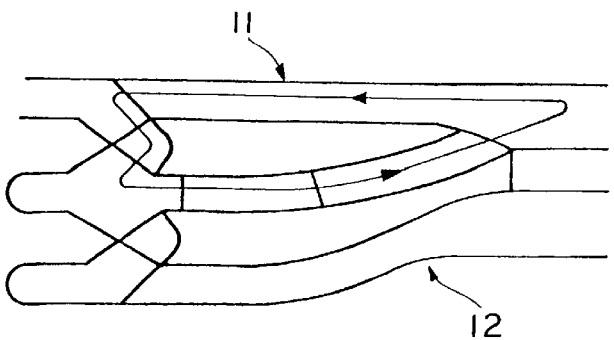
FIG. 17 is an explanatory diagram showing in what manner a transfer pin traces a first heart cam groove used as a lock mechanism in the connector device for IC card.
Figure 18:
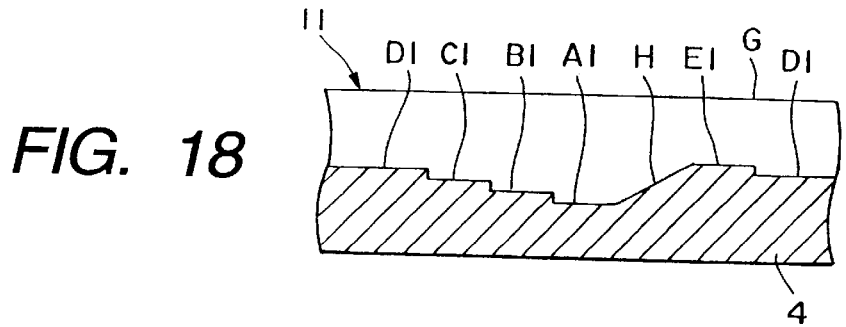
FIG. 18 is an explanatory diagram showing the heights of various cam faces formed in the first heart cam groove which is used as a lock mechanism in the connector device for IC card.

In interlock with the pushing motion of the push rod 5 the bent portion 15c of the transfer pin 15 traces the cam faces of the first heart cam groove 11 in the arrowed direction indicated by a solid line in FIG. 17. When the bent portion 15c is engaged with the cam face B1, the push rod 5 is held at its push-in position shown in FIGS. 1, 13A and 13B, and when one end of the guide hole 5a of the push rod 5 has come into engagement with the guide projection 4b of the frame 4, the push rod 5 is held at its projecting position, as shown in FIGS. 2, 14A and 14B.

Figure 19:
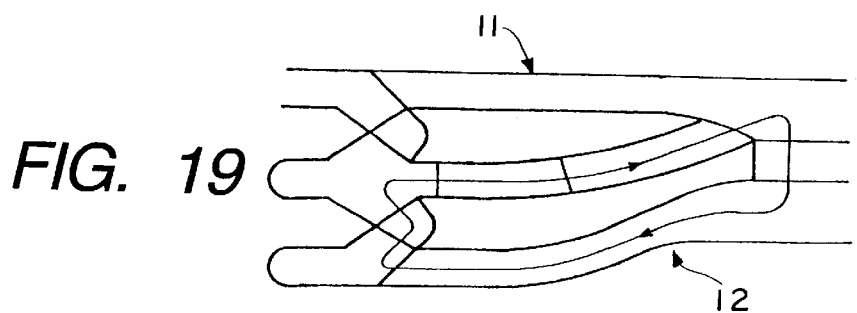
FIG. 19 is an explanatory diagram showing in what manner the transfer pin traces a second heart cam groove used as a lock mechanism in the connector device for IC card.
Figure 20:
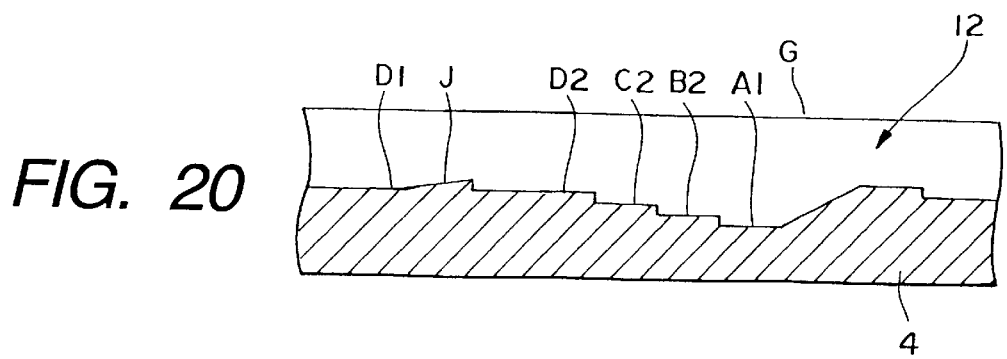
FIG. 20 is an explanatory diagram showing the heights of various cam faces formed in the second heart cam groove which is used as a lock mechanism in the connector device for IC card.

Further, interlockedly with the pushing motion of the push rod 5, the bent portion 15c of the transfer pin 15 can trace the cam faces of the second heart cam groove in the arrowed direction indicated by a solid line in FIG. 19. When the bent portion 15c is engaged with the cam face B2, the push rod 5 is held at the push-in position shown in FIGS. 1, 13A and 13B, while when the bent portion 15c has shifted from the common cam face E1 to D1 and one end of the guide hole a of the push rod 5 has come into engagement with the guide projection 4b of the frame 4, the push rod 5 is held at the projecting position, as shown in FIGS. 14A and 14B.

When the knob 14 lying at the projecting position is turned against the resilience of the spring member 14e, the knob rotates about the lug 5e together with the resilient member 16, so that the bent piece 16b of the resilient member 16 hooks the transfer pin 15 and causes the bent portion 15c to move. The bent portion 15c gets over the inclined cam face J from cam face D1 and reaches the cam face D2. If the push rod 5 is pushed in this state, the bent portion 15c leaves the cam face D2 and reaches the cam face C2. Then, when the pushing motion is cancelled, the push rod 5 is forced back slightly by the coiled spring 17 and the bent portion 15c goes into a state corresponding to the push-in position where it is engaged with cam face B2.

If the knob 14 which has been rotated is released, it is restored to its state before the rotation together with the resilient member 16.

Thus, the transfer pin 15 traces the first and second heart cam grooves 11, 12 selectively, and with rotation of the knob 14, the bent portion 15c of the transfer pin 15 shifts from the first heart cam groove 11 to the second heart cam groove 12.

In connection with the connector device for IC card constructed as above, the normal operation mode involving insertion of an IC card and subsequent ejection thereof will first be described below mainly with reference to FIGS. 16A, 16B, 17, 18 and 21A to 21G.

Figure 13A:
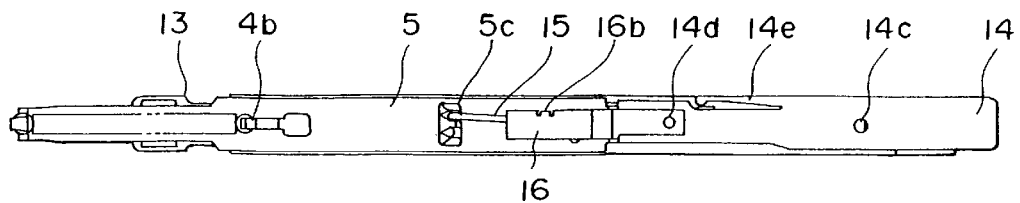
Figure 13B:
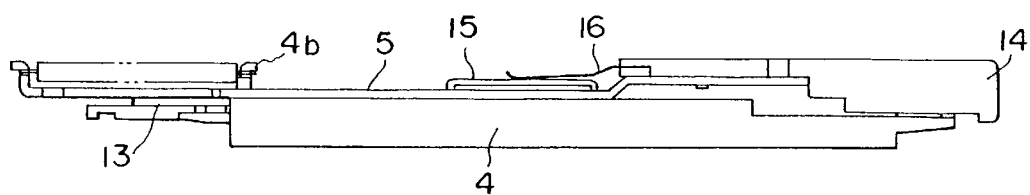
Figure 14A:
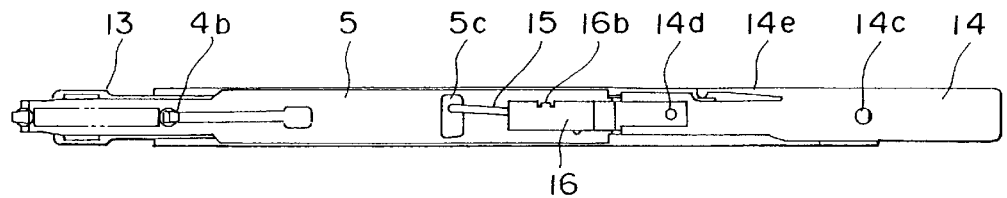
Figure 14B:
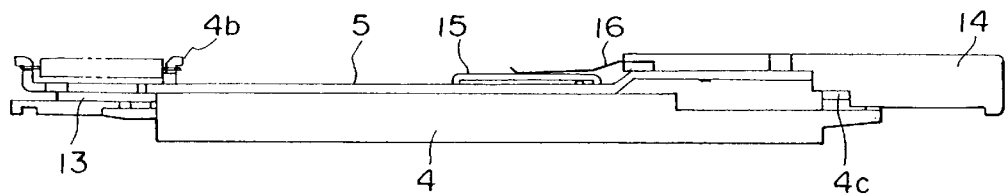

When the IC card 1 is not inserted into the connector device, the push rod 5 is held at the push-in position shown in FIGS. 1, 13A and 13B.

Figure 21A:
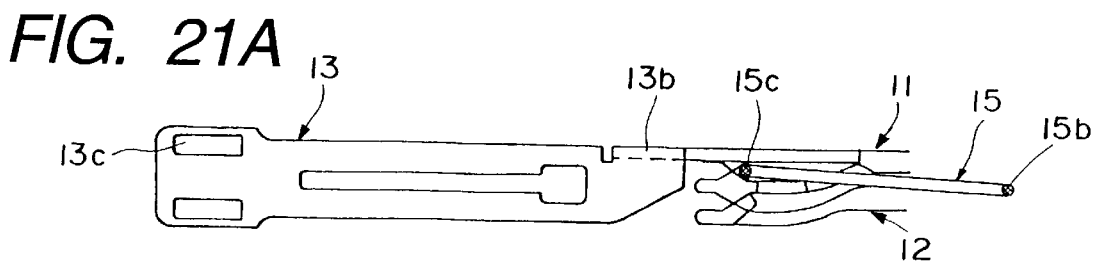
FIGS. 21A to 21G are explanatory diagrams showing ordinary ejecting operations in the connector device for IC card.

At this time, as shown in FIG. 21A, the bent portion 15c of the transfer pin 15 is engaged with the cam face B1 of the first heart cam groove 11, and the push rod 5 is held stably at the push-in position by the pulling force of the coiled spring 17 and by the transfer pin 15 which is engaged with the cam face B1.

In this state, as the IC card 1 is inserted along the guide grooves 4a of the frames 4, the IC card 1, which is advancing toward the pin housing 3, causes the pin contacts 2 of the pin housing 3 to be press-fitted into its socket contacts while pushing in the pawl pieces 7a and 8a of the first and second pivotable arms 7, 8. In this way the IC card 1 is inserted a predetermined distance into the connector device, whereupon the insertion is completed. In this completely inserted state, the IC card is sure to be connected with the pin contacts 2.

In association with the above operation, the first and second pivotable arms 7, 8 rotate reversely to each other about the first and second pivot shafts 9, 10, respectively, and the rotations of the pivotable arms 7 and 8 are transmitted to the ejection arm 6 through the connection between the tongue pieces 7b, 8b and the connecting hole 6a, so that the ejection arm 6 rotates about the first pivot shaft 9, and interlockedly with this rotation the drive plate 13 moves to a position in front of the associated frame 4.

Figure 21B:
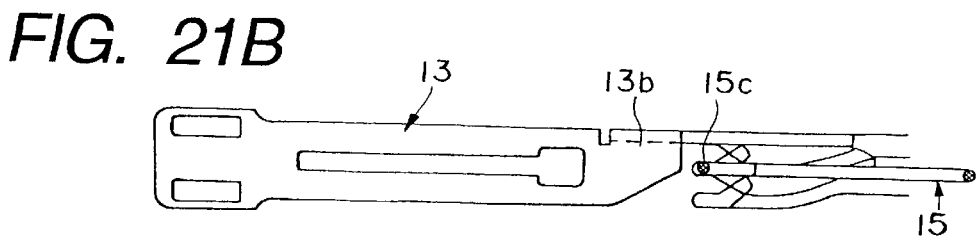
Figure 21C:
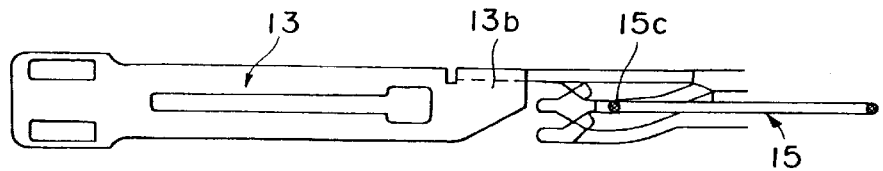
Figure 21D:
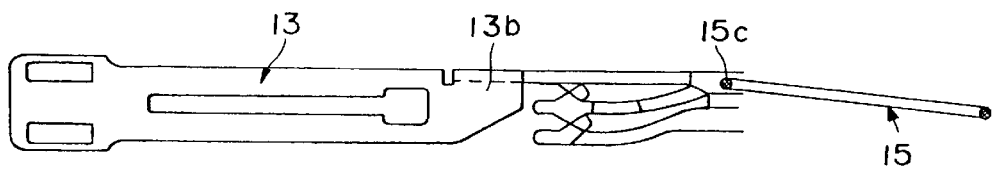
Figure 21E:
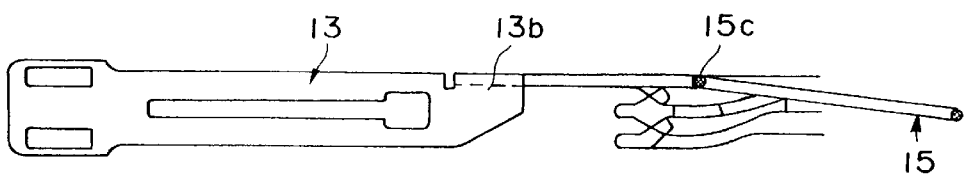
Figure 21F:
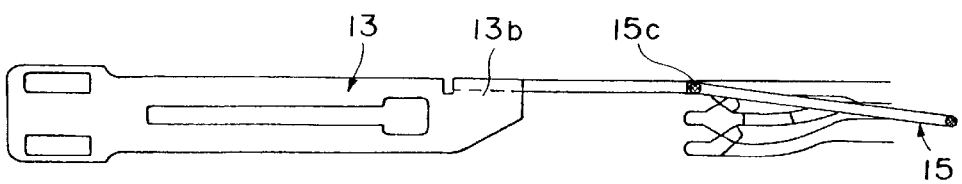
Figure 21G:
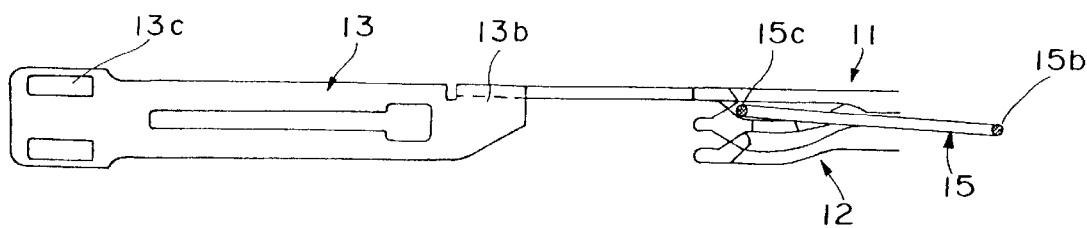

As a result, as shown in FIGS. 21G to 21A, the receiving portion 13b of the drive plate 13 shifts from the state where it lies on the cam face C1 of the first heart cam groove 11 to the state where it lies on the cam face D1. However, since the bent portion 15c of the transfer pin 15 is engaged with the cam face B1 deviated from the cam face D1, the transfer pin 15 maintains this state, and during connection of the IC card 1, the push rod 5 remains at the push-in position.

For ejecting the IC card 1 from the state of FIG. 21A, first the push rod 5 held at the push-in position is pushed forward, that is, the pushing motion is performed, causing the knob 14 of the push rod 5 to be projected up to the projecting position, as shown in FIGS. 2, 14A and 14B.

Once the push rod 5 held at the push-in position is pushed, the bent portion 15c of the transfer pin 15 shifts from the cam face B1 of the first heart cam groove 11 to the cam face A1, as shown in FIG. 21B. If in this state the pushing motion of the push rod 5 is cancelled, the bent portion 15c shifts from cam face A1 to cam face D1 through cam faces H and E1 under the pulling force of the coiled spring 17.

At this time, the bent portion 15c does not return to the cam face B1 because the cam face A1 is lower than cam face B1.

To be more specific, the state of the bent portion 15c shifts from FIGS. 21B to 21D via 21C. As shown in FIG. 21D, the bent portion 15c of the transfer pin 15 and the receiving portion 13b of the drive plate 13 become opposed to each other in the cam face D1.

Thus, when the knob 14 of the push rod 5 is pushed toward the push-in position after allowing the push rod 5 to be projected up to the projecting position, as shown in FIGS. 21E and 21F, the bent portion 15c of the transfer pin 15 shifts from the cam face D1 of the first heart cam groove 11 to the cam face C1 and in this shifting process the bent portion 15c presses the receiving portion 13b of the drive plate 13, so that the ejection arm 6 engaged with the drive plate 13 rotates.

With this rotation, the pawl pieces 7a and 8a of the first and second pivotable arms 7, 8 push both end portions of the IC card nearly straight in the disengaging direction, so that, as shown in FIG. 3, the IC card 1 moves out of the press-fitted contact between its socket contacts and the pin contacts of the pin housing 3. Now, the IC card can be ejected easily from the connector device by holding this side of the IC card 1 with fingers.

During this pushing motion of the push rod 5, the bent portion 15c does not return to the cam face E1 because the cam face D1 is lower than the cam face E1.

When the pushing motion of the push rod 5 toward the push-in position is cancelled, as shown in FIG. 21G, the push rod 5 is pushed back by the coiled spring 17, the bent portion 15c of the transfer pin 15 leaves the cam face C1 of the first heart cam groove 11 and reaches the cam face B1, and the push rod assumes its push-in position at which the bent portion 15c is engaged with the cam face B1.

At this time, the bent portion 15c does not return to the cam face D1 because the cam face C1 is lower than the cam face D1.

Even if the push rod 5 should be projected by mistake after insertion of the IC card into the connector device, an ejecting motion cancelling mode is executed for returning the IC card to the push-in position without ejection thereof. This cancelling mode will now be described mainly with reference to FIGS. 13A, 13B, 14A, 14B, 15A, 15B, 21A to 21G and 22A to 22E. FIG. 21A shows a state in which the push rod 5 is held in the push-in position after insertion of the IC card into the connector device. If in this state the push rod 5 should be pushed by mistake even when the IC card is not required to be ejected, the push rod 5 projects up to the projecting position, as noted previously and as shown in FIG. 22A, FIGS. 14A and 14B, and the bent portion 15c of the transfer pin 15 and the receiving portion 13b of the drive plate 13 are opposed to each other in the cam face D1 of the first heart cam groove 11.

Figure 15A:
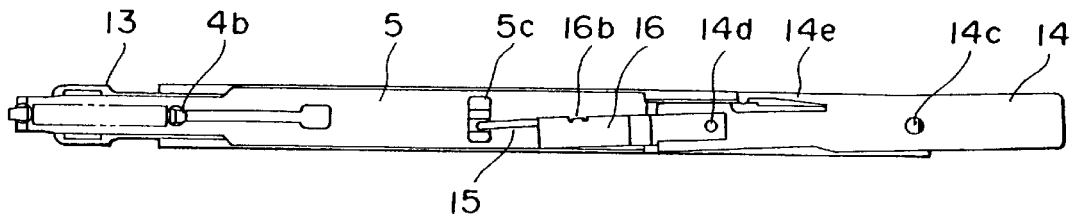
Figure 15B:
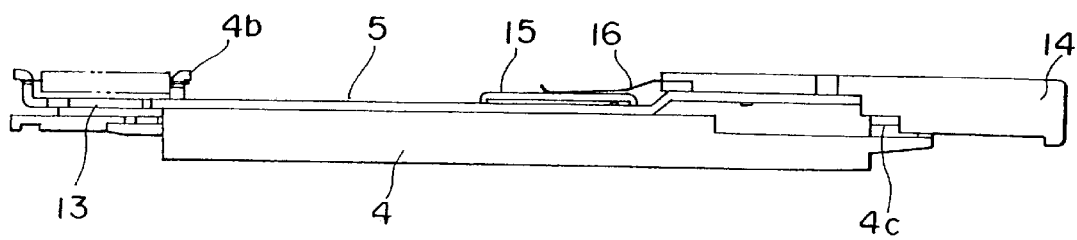
Figure 16A:
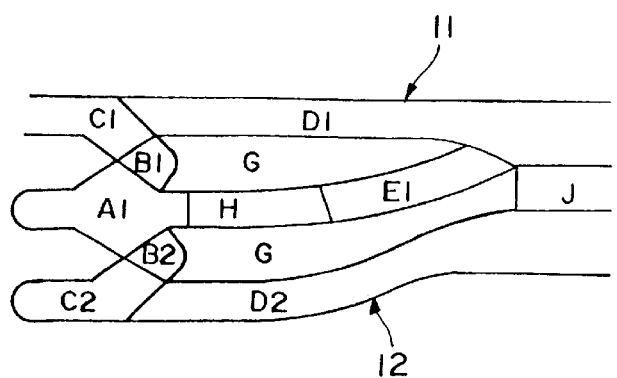
Figure 16B:
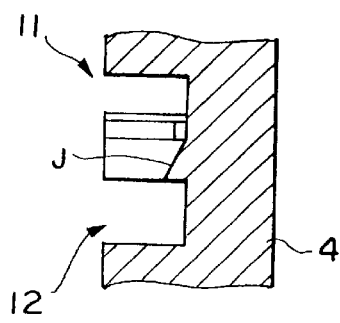

If in the state corresponding to this projecting position, namely the state of FIGS. 14A and 14B, the knob 14 is turned against the resilience of the spring member 14e, the resilient member 16 is rotated by the knob 14 and the bent piece 16b of the resilient member 16 hooks the transfer pin 15 and causes the transfer pin to rotate into such a state as shown in FIGS. 15A and 15B.

Figure 22A:
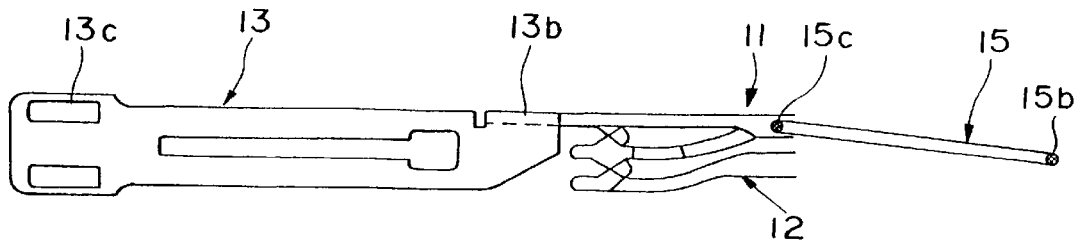
FIGS. 22A to 22E are explanatory diagrams showing operations for cancelling the ejecting motion in the connector device for IC card.
Figure 22B:
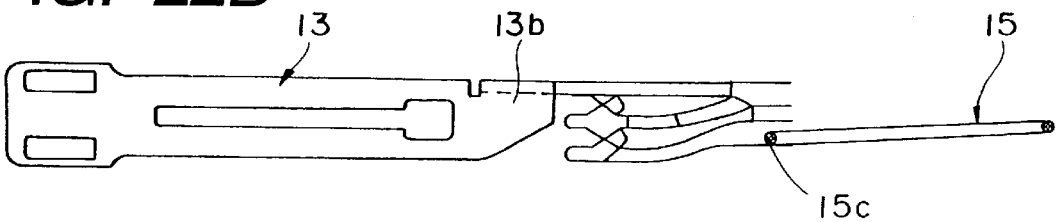

At this time, the bent portion 15c of the transfer pin 15 gets over the inclined cam face J and shifts from cam face D1 of the first heart cam groove 11 to cam face D2 of the second heart cam groove 12, as shown in FIG. 22B.

When the rotation of the knob 14 is stopped, both knob 14 and resilient member 16 are restored to their original states before the rotation by means of the spring member 14e, but the bent portion 15c is prevented from moving to the cam face D1 by means of the cam face J and remains positioned on the cam face D2 of the second heart cam groove 12.

Figure 22C:
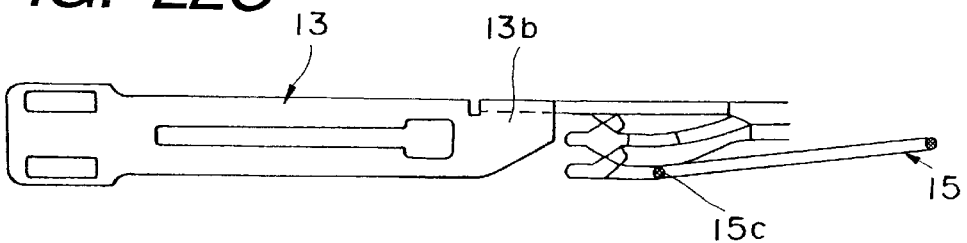
Figure 22D:
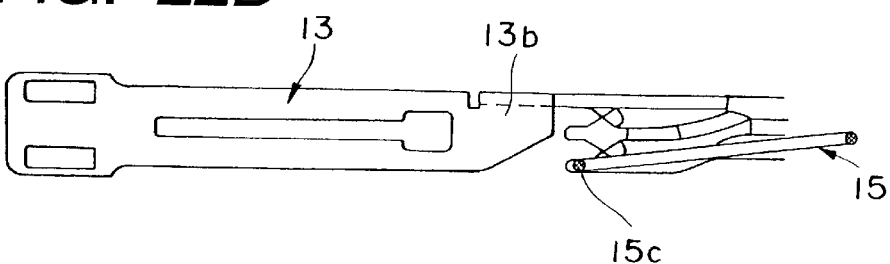

If in this state the knob 14 of the push rod 5 is pushed toward the push-in position, the bent portion 15c of the transfer pin 15 goes through the state of FIG. 22C and shifts from cam face D2 to cam face C2 of the second heart cam groove 12, as shown in FIG. 22D. In this shift process, the bent portion 15c does not press the receiving portion 13b of the drive plate 13, so that the ejection arm 6 does not rotate and the socket contacts of the IC card 1 and the pin contacts 2 of the pin housing 3 remain press-fitted together.

Figure 22E:
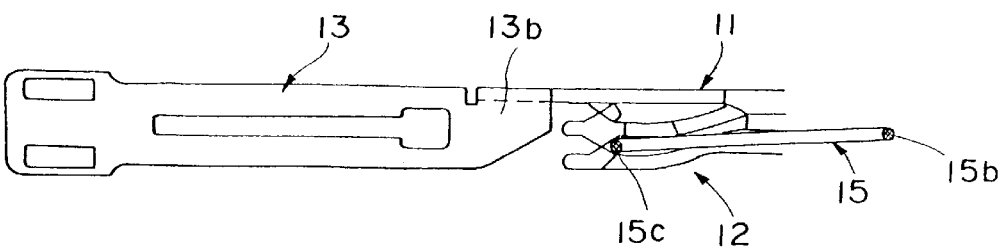

Then, when the pushing motion of the push rod 5 is cancelled, the bent portion 15c of the transfer pin 15 shifts from the cam face C2 of the second heart cam groove 12 to the cam face B2 thereof, as shown in FIG. 22E, and the push rod 5 is retained in this push-in position, assuming such a state as shown in FIG. 1.

At this time, the bent portion 15c shifts to the cam face B2 without return to the cam face D2 because the cam face C2 is lower than cam face D2.

Next, for ejecting the IC card from its state shown in FIG. 22E, the push rod 5 lying in the push-in position is pushed in the same manner as above.

As a result, the bent portion 15c of the transfer pin 15 leaves the cam face B2 of the second heart cam groove 12, passes the common cam faces A1, H and E1 of both heart cam grooves and reaches the cam face D1, as shown in FIGS. 21D and 22A.

If the push rod 5 is pushed in this state assuming the projecting position, there are performed the same operations as in FIGS. 21A to 21G in the foregoing normal operation mode.

As will be seen from the above description, when the push rod 5 is projected up to the projecting position and is pushed toward the push-in position, the pushing force of the push rod is transmitted to the drive plate 13 through a single transfer pin 15 which traces the first heart cam groove 11, whereby the IC card can be ejected.

On the other hand, if the push rod 5 should be projected to the projecting position by mistake despite the ejection of the IC card 1 being not required, for example, in ejection mechanisms of connector devices for IC card stacked in two vertical stages, if at the time of operating one push rod 5 the other push rod 5 should be misoperated, what should be done is rotating the knob 14, causing the bent portion 15c of the transfer pin 15 to shift from the first heart cam groove 11 to the second heart cam groove 12, when the push rod 5 has come to assume the projecting position, and subsequently pushing the push rod 5 toward the push-in position. As a result, the transfer pin 15 traces the second heart cam groove 12, and since the drive plate 13 is not operated by the transfer pin, the ejection of the IC card 1 is cancelled to maintain the inserted state of the card.

Although the connector device of the above embodiment permits insertion therein of one IC card, plural such connector devices maybe stacked vertically, or amodification may be made so that plural IC cards can be inserted into the frames. In this case, corresponding push rods are provided so that each individually permits insertion and ejection of an IC card through an ejection mechanism.

Although in the above embodiment the first and second heart cam grooves 11, 12 use the cam faces A1, Hand E1 in common, these cam faces may be formed in a separated manner.

According to the present invention, as set forth above, when the IC card 1 as inserted into the connector device is to be ejected, the push rod 5 is projected up to the projecting position and is pushed in this state, whereby the IC card 1 is ejected through a single transfer pin 15. In the event the push rod 5 should be projected by mistake the ejection of the IC card 1 being not required, the knob 14 is turned at the projecting position, causing the transfer pin 15 to shift from the first heart cam groove 11 to the second heart cam groove 12, and in this state the push rod 5 is pushed toward the push-in position. Since by turning a single transfer pin 15 the IC card ejecting motion is cancelled and the IC card is maintained in its inserted state, the usual ejecting motion requiring frequent operations becomes simple and easy in comparison with the prior art. Besides, since the cancellation of ejection, which is less frequent, is effected by the rotating motion, it is possible to provide a connector device superior in operability.

This is also effective in using plural IC cards 1 because in a vertically stacked construction of plural connector devices there often occurs an erroneous pushing of a push rod 5 which is positioned adjacent a push rod 5 to be pushed.

Besides, since the ejection of the IC card 1 and cancellation of the ejection are performed by motions of a single transfer pin 15, it is possible to provide a connector device which is small in the number of components, simple in construction, less expensive and small-sized.

Moreover, since the ejection of IC card land cancellation thereof are performed by juxtaposed, first and second heart cam grooves 11, 12, a single transfer pin 15 which traces the heart cam grooves 11 and 12, and a drive plate 13 capable of being engaged with and disengaged from the transfer pin 15, the number of components and the space required can be reduced and it is possible to provide a connector device which is superior in assembling performance, less expensive and small-sized.

Further, since the cam faces of the first and second heart cam grooves 11, 12 are partially used in common, it is possible to provide a connector device of a smaller size.

At the push-in position of the push rod 5 the transfer pin 15 is locked in the first or the second cam groove 11 or 12, while when the push rod 5 is in the projecting position, the transfer pin 15 is opposed to the drive plate 13. When the push rod 5 is pushed at the projecting position, the transfer pin 15 passes cam faces of the first heart cam groove 11 and presses the drive plate 13 to eject the IC card 1. When the push rod 5 is pushed after rotation of the knob 14 at the projecting position, the transfer pin 15 passes cam faces of the second heart cam groove 12 to cancel the pressed state of the drive plate 13. Thus, it is possible to provide a connector device which is small-sized and reliable in its IC card ejecting and ejection cancelling motions.

Further, since the spring member 14e for restoring the knob 14 to its state before the rotation, the knob 14 can be reset automatically and it is possible to provide a connector device capable of being operated without any sense of incongruity in the pushing motion of the push rod 5.

The provision of the spring member 14e integral with the knob 14 can afford a connector device simple in construction, small in the number of components, less expensive and superior in productivity.

Further, since the upper side portion 15a of the U-shaped transfer pin 15 is brought into abutment against the protuberance 5d of the push rod 5 and is pressed elastically by the resilient member 16 between the bent portion 15c of the transfer pin 15 engaged with a cam face and the protuberance 5d, the transfer pin 15 is sure to trace the cam face, so not only the push rod 5 can be operated accurately, but also it is possible to provide a connector device which permits smooth movement of the transfer pin 15.

Further, since the bent portions 15b and 15c of the U-shaped transfer pin 15 are of the same length, the transfer pin can be mounted without the need of taking its directionality into account at the time of assembly and thus it is possible to provide a connector device superior in productivity.

Further, since during rotation of the knob 14 the transfer pin 15 is shifted from the first heart cam groove 11 to the second heart cam groove 12 through the resilient member 16, the resilient member 16 functions to not only press the transfer pin 15 but also cause the transfer pin to move and hence it is possible to provide a connector device which is small-sized, less expensive and superior in productivity.

What is claimed is:

1. A connector device for IC card, comprising:
    a frame for supporting the IC card so as to permit insertion and ejection of the IC card with respect to the connector device;
    a push rod capable of reciprocating between a push-in position and a projecting position;
    a transfer pin secured to the push rod pivotably; and
    a knob attached pivotably to said push rod,
    wherein with the IC card inserted into the connector device, the push rod is held at the push-in position by a lock mechanism of the transfer pin, and in this state, by a first pushing motion of the push rod, the lock mechanism of the transfer pin is unlocked and the push rod moves to the projecting position, then at the projecting position the IC card is ejected by the transfer pin in accordance with a second pushing motion of the push rod, further, when the push rod is at the projecting position, the knob is turned to rotate the transfer pin and thereafter the transfer pin is rotated by a pushing motion of the push rod to cancel the ejection of the IC card.

2. A connector device for IC card according to claim 1, wherein said lock mechanism comprises of two, juxtaposed, first and second heart cam grooves, said transfer pin is rotated and allowed to trace said first and second heart cam grooves, further, a drive plate engageable with and disengageable from the transfer pin and capable of reciprocation is provided, and when said push rod lying at the projecting position is pushed, the transfer pin, in an opposed state to the drive plate, traces the first heart cam groove and moves the drive plate, causing the IC card to be ejected through the drive plate, further, with the push rod lying at the projecting position, said knob is turned, causing the transfer pin to shift from the first heart cam groove to the second heart cam groove, thereafter, when the push rod is pushed, the transfer pin traces the second heart cam groove and the opposed state of the transfer pin to the drive plate is cancelled to cancel the ejection of the IC card.

3. A connector device for IC card according to claim 2, wherein adjacent cam grooves of said juxtaposed, first and second heart cam grooves are used partially in common.

4. A connector device for IC card according to claim 2, wherein when said push rod is at said push-in position, said transfer pin is locked by said first heart cam groove, the transfer pin and said drive plate are not opposed to each other, and when the push rod is pushed at the push-in position, the transfer pin moves together with the push rod and traces the first heart cam groove, with the transfer pin becoming opposed to the drive plate, allowing the push rod to assume said projecting position, further, at the projecting position said knob is turned, causing the transfer pin to shift from the first heart cam groove to the second heart cam groove, thereafter, when the push rod is pushed, the transfer pin traces the second heart cam groove and is locked by the second heart cam groove, allowing the push rod to assume the push-in position, further, when the push rod is pushed at the push-in position, the transfer pin moves together with the push rod and traces the second heart cam groove, with the transfer pin becoming opposed to the drive plate, allowing the push rod to assume the projecting position.

5. A connector device for IC card according to claim 1, further including a spring member which, after the rotation of said knob, restores the knob to its state before the rotation.

6. A connector device for IC card according to claim 5, wherein said spring member is integral with said knob, and part of the spring member is brought into abutment against said push rod.

7. A connector device for IC card according to claim 2, wherein said transfer pin is formed in U shape having an upper side portion and bent portions formed at both ends of said upper side portion, said push rod has a protuberance, the upper side portion of the transfer pin is brought into abutment against said protuberance, one bent portion of the transfer pin is brought into engagement with said heart cam grooves, and between the one bent portion of the transfer pin and said protuberance, the upper side portion of the transfer pin is pressed resiliently by a resilient member.

8. A connector device for IC card according to claim 7, wherein said bent portions formed at both ends of said upper side portion of the U-shaped transfer pin have the same length.

9. A connector device for IC card according to claim 7, wherein when said knob is turned, said transfer pin is shifted from said first heart cam groove to said second heart cam groove through said resilient member.

\* \* \* \* \*